Jan. 10, 1956  J. J. NICHTA  2,730,229
STOCK STOP FOR MACHINE TOOL
Filed July 14, 1953  2 Sheets-Sheet 1

INVENTOR.
JOHN J. NICHTA
BY Hudson, Boughton,
Williams, David & Hoffmann
ATTORNEYS

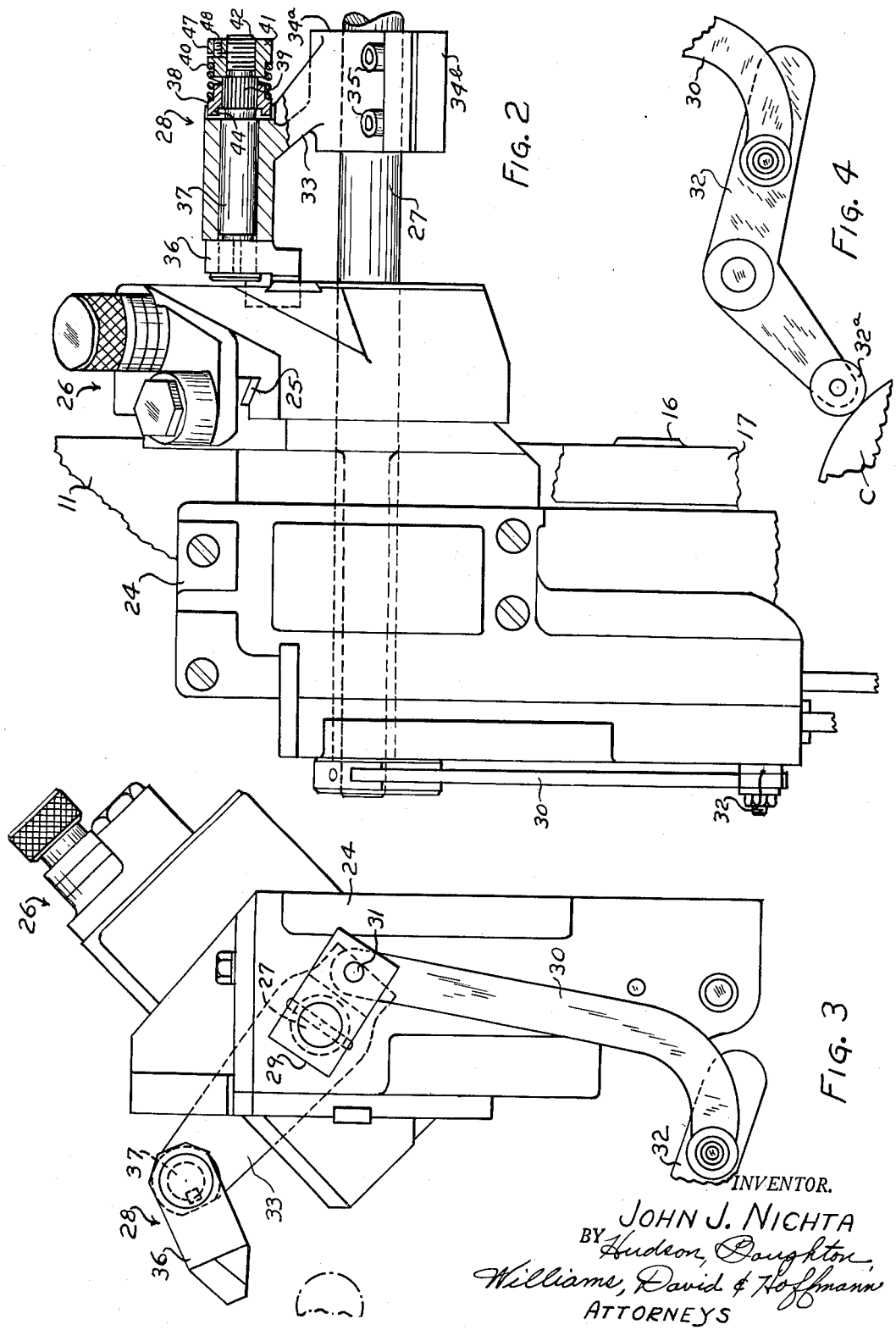

United States Patent Office 2,730,229
Patented Jan. 10, 1956

2,730,229

STOCK STOP FOR MACHINE TOOL

John J. Nichta, Parma, Ohio, assignor to The Warner & Swasey Company, Cleveland, Ohio, a corporation of Ohio Application July 14, 1953, Serial No. 367,829

12 Claims. (Cl. 203—35)

This invention relates to machine tools and, more particularly, to an improved stock stop for a machine tool adapted to utilize bar or like stock.

Machine tools such as lathes, screw machines, and the like which are designed for operating upon bar or like stock customarily have the stock fed axially through a hollow spindle with the length of the stock utilized in the machining operation or operations being determined by abutment of the forward end of the stock with a stock stop provided in advance of, and in alignment with, the spindle. Machines of this nature are frequently of the multispindle type with the spindles mounted in a carrier which is rotatably indexible to permit performing a plurality of machining operations upon each piece of stock in successive steps of one cycle of operations. Such operations frequently include axial drilling or tapping of the work and it is possible that such a tool may break off with a portion of the latter extending outwardly of the work. This may cause damage to the stock stop or to other parts of the machine tool since the machined work is generally cut off from the stock at the station where the length of the stock to be operated upon is gauged. Hence, when the spindles are indexed, bringing the machined work to the station for severing, a broken tool or other undesired projection from the work strikes the bar stop from the side. This may simply result in breaking off the projecting portion of the broken tool or the like in which event the stock stop or other parts of the machine tool are not damaged although they may be undesirably strained. Not infrequently, however, such an occurrence results in breakage of a portion of the stock stop. This, in turn, may allow the stop to drop into the path of movement of the cutoff tool or other tools thereby damaging the same.

In an effort to reduce the damage to the stock stop and straining or other damage to machine tools resulting from the aforementioned lateral striking of the stock stop, shear pins or the like were employed in parts of the stop mechanism. This did not prove satisfactory since not only was valuable time lost in replacing such pins but operators were inclined to substitute hardened steel pins or the like for the shear pins thereby completely destroying the intended insurance against breakage or stressing of the machine parts. Moreover, breaking of a shear pin still allowed the stop to drop to a position where it interfered with operation of the cutoff or other tools causing damage thereto.

An object of this invention is to provide an improved stock stop for a machine tool, of the type in which bar stock is fed through a hollow spindle into engagement with the stop, such that the stop may yield in a direction transversely of the direction of feeding of the stock.

Another object of the invention is to provide an improved stock stop for multispindle machine tools of the bar stock type wherein the stock stop provides a rigid abutment for the stock in the direction of feeding thereof and is also capable of yielding in a direction transversely of the direction of feeding in response to lateral engagement therewith thereby preventing damage to the stock stop or to other parts of the machine tool by such engagement.

An additional object of the invention is to provide a stock stop of the type defined above which may yield in a direction transverse to the direction of feeding of the stock in response to lateral engagement of objects therewith and which is so constructed that the stop is automatically restored to its normal position for all but very large displacements thereof, the stop being readily manually restored when displaced a distance greater than that from which automatic restoration occurs.

A further object of the invention is to provide an improved mounting for a stock stop of a multiple spindle bar type machine tool such that the stop is provided adjacent one end of an arm the other end of which is pivotal about an axis parallel with the direction of stock feeding and with the arm resiliently maintained in stock gauging position, whereby the stop may arcuately yield to permit passage of a broken tool or other projection on the work that engages the stock stop during indexing of the spindles.

A more specific object of the invention is to provide a stock stop for a multiple spindle bar stock type machine tool in which the stop is supported upon a member extending laterally of the direction of feeding movement of the stock and is pivotal about an axis parallel with the direction of stock feeding; the member being normally maintained in stock gauging position by interfitting surfaces having inclined sides which surfaces are held in engagement by spring means so that a lateral force applied to the member causes the latter to move in an arcuate path against the action of the spring means and the said spring means acts through the inclined surfaces to restore the member to its normal position upon release of the lateral force applied to the member.

The invention further resides in certain novel features of the construction and in the combination and arrangement of the parts of the apparatus in which the invention is embodied, and further objects and advantages thereof will be apparent to those skilled in the art to which the invention pertains from the following description of the presently preferred embodiment taken in conjunction with the accompanying drawings, forming a part of this application, and in which:

Fig. 2 is a fragmentary view, to a larger scale than Fig. 1, illustrating the improved bar stop and adjacent tool slide supporting means as seen from the left of Fig. 1, a part of the bar stop mechanism being shown in longitudinal section to more clearly reveal the construction thereof;

Fig. 3 is an end elevational view of the mechanism shown in Fig. 2 with a piece of the bar stock indicated in dot-dash lines and with the stock stop swung to inoperative position, a portion of the mechanism for effecting this movement being broken away;

Fig. 4 is a detached, fragmentary view of a portion of the mechanism for periodically moving the stock stop to and from operative position;

Figure 1:
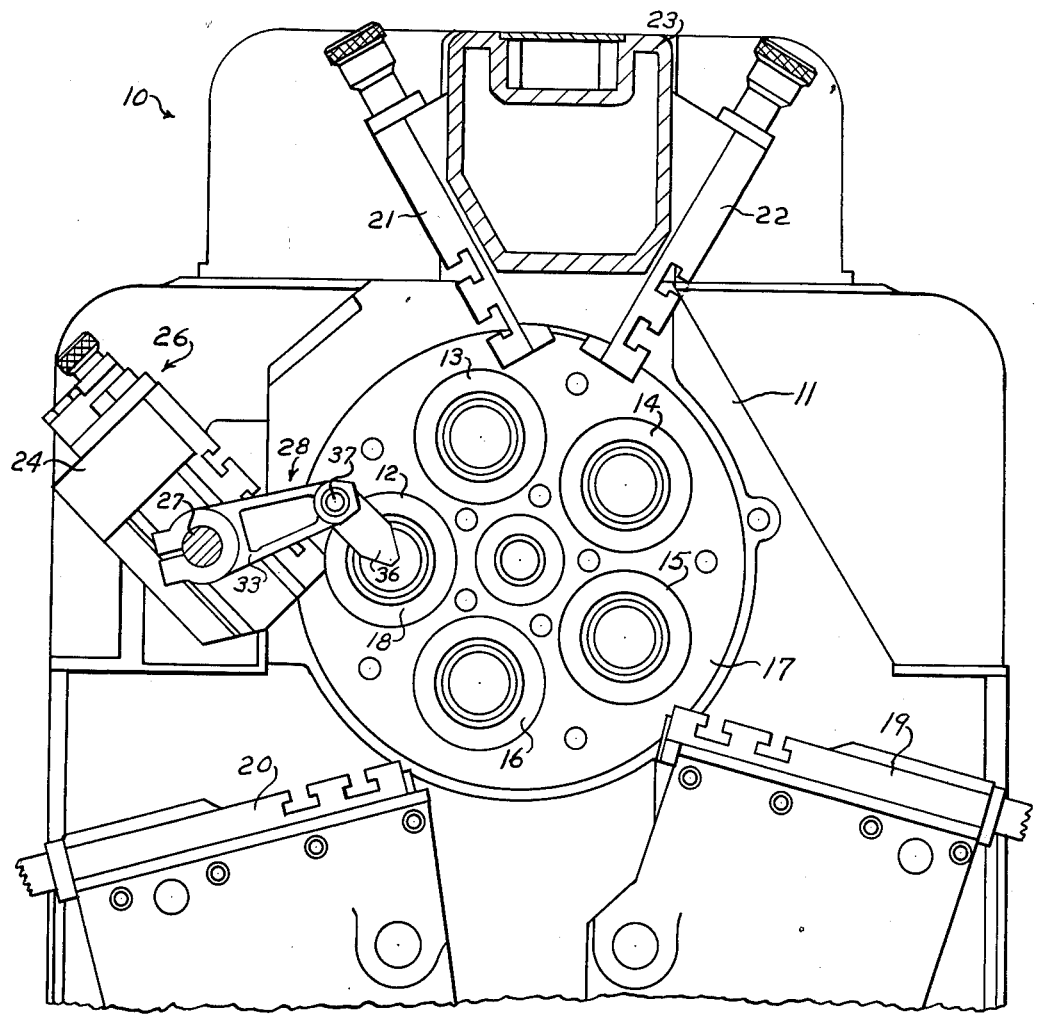
Fig. 1 is a fragmentary view of a multiple spindle bar stock machine tool as seen from a position adjacent the forward ends of the spindles with the improved bar stop positioned in alignment with one of the spindles, the view being principally in elevation but with the upper longitudinal support of the machine shown in transverse section.

The improved stock stop of this invention is shown incorporated in a multiple spindle machine tool of the lathe type, generally designated 10. This machine is of conventional construction and comprises a head stock 11 in which a plurality of hollow spindles 12, 13, 14, 15 and 16 are individually rotatably mounted in a rotatably indexible carrier or member 17. Each of the spindles is adapted to have bar stock or the like fed axially therethrough to a predetermined length and, after such feeding, the stock is gripped by a suitable chuck 18 of the collet type, one of which is provided upon each of the spindles. The bar or other stock thus gripped is machined in a plurality of operations performed at different indexed stations or positions of the carrier 17 through tools carried upon suitable tool slides or upon a longitudinally movable turret.

In the form of the machine here shown, the spindle 12 is at the position or station where the bar stock is fed forwardly of the spindle to provide the predetermined length thereof upon which the machining is to be performed. After such feeding of the stock, the latter is gripped and the carrier 17 with the spindles are indexed a distance to bring a new spindle into the stock feeding position and to dispose the spindle 12 at one of the other stations or positions. Where the machine tool has five spindles, as is here shown, each indexing motion of the spindles and carrier effects movement of the latter through an arc of 72°. The machining operations may be of the usual types and are effected by suitable tools provided, for example: upon reciprocating cross slides 19 and 20, positioned below the spindles; upon the tool slides 21 and 22, which are positioned above the spindles and mounted upon a horizontally extending reenforcing member 23 of the frame; and by suitable tools which are supported upon an axially movable turret or the like, not shown, but which is conventional in machines of this type.

In the machine tool thus far described, it is customary to provide for cutoff of the completed workpiece at the station or location of the spindles where the stock is axially fed therethrough. In the illustrated machine, for example, a bracket or mounting 24 is secured to one side of the head stock 11 and is provided with inclined dove tails or other guide surfaces 25 on which a cutoff slide 26 is reciprocated to carry cutoff and/or other tools to and from cooperation with the work or stock at the position illustrated for the spindle designated 12. The mounting bracket 24 for the cutoff slide 26 also provides a bearing for a horizontally extending rod or shaft 27 on which a stock stop, generally designated 28, is mounted. This stock stop has a portion which is adapted to extend into axial alignment with the spindle at the position of spindle 12 and provide an abutment for bar stock or the like when the latter is fed through the spindle to thereby gauge the length of stock upon which the machining operations are to be effected. The stock stop is adapted to be moved out of the aforementioned alignment with the spindle after the gauging operation, to facilitate indexing of the spindle carrier, and the stop is then moved back into alignment with the next succeeding spindle, when it is disposed at the stock feeding position, to gauge the length of the stock fed through this newly indexed spindle.

In the machine here illustrated, the movement of the stock stop into and out of alignment with the successively indexed spindles is effected by providing the rod or shaft 27 with a transversely extending member 29, see Fig. 3, which is non-rotatably secured to the rod or shaft 27 and is slotted adjacent its outer end for reception of the upper end of the bent arm or link 30. The upper end of the arm or link 30 is pivotally connected with the member 29 by means of a stub shaft or pin 31. The lower end of the arm or link 30 is pivotally connected to one arm of a bell-crank lever 32 and the other arm of the latter is provided with a cam follower 32a which cooperates with a cam C, see Fig. 4, that is rotated in timed relationship with the indexing of the spindle carrier. The construction is such that the cam rocks the lever 32 and this, in turn, acts through link 30, member 29 and shaft 27 to rock the stock stop 28 into and out of alignment with the spindle disposed at the bar feeding position to thereby gauge the length of the stock to be employed. This length is determined by abutment of the stock with the stock stop 28 which may be adjusted axially towards and from the spindles. In the illustrated embodiment, this adjustability is achieved by providing the stop with a bracket portion or member, such as 33, which is releasably clamped to the shaft 27 by split sleeve portions 34a, 34b that are held together by screws or bolts 35.

When the stock has been gauged in length by abutment with the stock stop 28, movement of the latter from alignment with the spindle is begun and the spindles are also indexed to bring a previously machined piece of the stock back to the feeding and gauging station, these operations being effected in timed relationship since cam C rotates in timed relationship with the indexing of the spindle carrier 17. When the indexing is complete, the cutoff slide 26 will move inwardly to sever the completed workpiece and, before a new length of stock is fed, the stock stop will have been swung back into active position.

The constructions thus far described are substantially conventional and, when employing such mechanisms, it has been found that a drill, tap or other tool may break off in the work carried by the spindles. When this happens and the work is indexed for cutoff, the axially protruding broken tool or other projection strikes the stock stop from the side thereof since the stop will not have been completely removed from the active position before the machined work begins moving into the cutoff position. This has frequently resulted in damage to the stock stop and/or breakage to other parts of the machine tool since breakage in any of the interconnected parts of the stock stop generally allows the abutment portion of the stop to drop by gravity to a position where it interferes with movement of the cutoff slide thereby damaging the latter.

The aforementioned difficulties have been obviated by the improved stock stop because the latter is so constructed that lateral engagement of an object with the stock stop does not cause breakage of any of the parts of the stop mechanism and hence the stop cannot drop into the path of the cutoff slide to damage it or other parts of the machine tool. On the contrary, the construction is such that the stop can yield to permit passage of a projection which strikes it and thereafter the stop is automatically returned to its operative position when the required yielding has not been excessive. However, should an abnormal amount of yielding be necessary to permit passage of the projection on the work, the stock stop may be manually returned to its operative position without the need of special tools or stopping of the machine.

Figures 5, 6, 7:
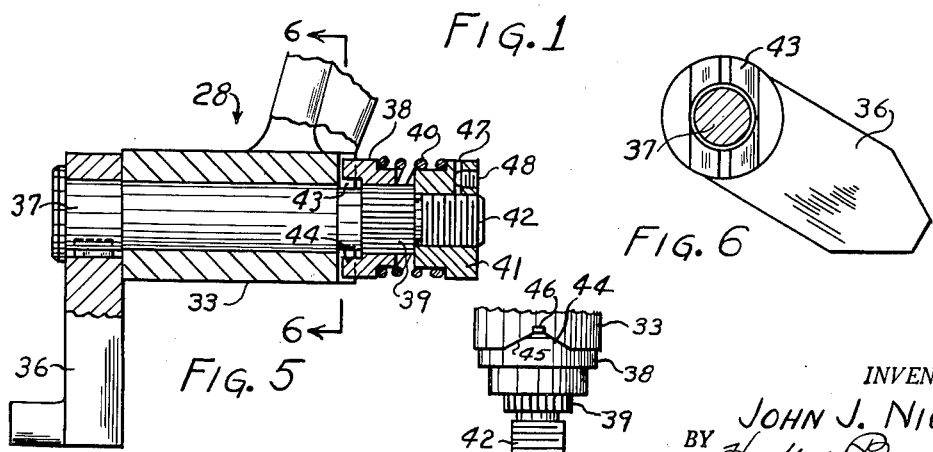
Fig. 5 is a view of the stock stop per se, the view being principally in longitudinal section but with parts shown in side elevation.
Fig. 6 is a transverse sectional view through the stock stop of Fig. 5 substantially on the section indicating line 6—6 of Fig. 5.
Fig. 7 is a fragmentary, detached, top elevational view of the interfitting surfaces for normally maintaining the stock stop in predetermined position.

These desirable features of the stock stop are achieved by constructing the latter substantially as illustrated in Figs. 2, and 5 to 7 of the drawings. As shown therein, the stop comprises an arm or portion 36 which extends transversely of the axes of the spindles, the outer end of this portion has a suitable surface for abutment by the bar stock fed through the spindles. The opposite end of the arm or portion 36 is connected to, or integral with, a cylindrical member or shaft 37 that is rotatable in a bore of the bracket member 33. This bore extends parallel with the axes of the spindles but is disposed at one side thereof. The end of the cylindrical member or shaft 37 opposite the arm or portion 36 has a member 38 thereon which is non-rotatably but axially movably connected with the shaft or portion 37. In the illustrated embodiment, the member 38 is in the form of a sleeve which has its bore provided with serrations or splines cooperating with serrations or splines 39 on the member or shaft 37. The adjacent faces of the bracket 33 and the sleeve or member 38 are provided with cooperating axially interfitting surfaces that are normally held in engagement by a compression spring 40 which extends between an integral shoulder on the member or sleeve 38 and abutment member or nut 41 screwed upon the threaded outer end 42 of the member or shaft 37.

The axially engageable interfitting surfaces provided upon the bracket 33 and the sleeve or member 38 are preferably formed by a projection or projections on one of these members having an inclined side face or faces or surfaces which engage in a complementarily-shaped recess or recesses in the other of the members. As here shown, the rear face of the bracket member 33 has two diametrically extending recesses 43, which are substantially triangular in cross section, and the adjacent face of the sleeve or member 38 has projections 44 thereon with inclined sides 45 interfitting in the said recesses 43. The inner ends of the projections 44 are preferably planar, as indicated at 46 in Figs. 6 and 7, and the outer face of the bracket member 33 in the regions between the recesses 43 is likewise planar.

The construction illustrated and described is such that lateral engagement of an object with the arm or portion 36 of the stop 28 results in partial rotation of the shaft 37. This is permitted by the inclined surfaces upon the recesses 43 and the projections 44 acting as cams to produce slight axial movement of the member or sleeve 38 against the force of the spring 40. The proportions of the parts and the angles of the inclined surfaces of the recesses and projections are such that the amount of rotative displacement of the portion or arm 36 of the stock stop to permit passage of a projection or object upon the work does not result in complete displacement of the projections 44 from the recesses 43. Hence, the spring 40, acting through the inclined surfaces of the recesses 43 and projections 44, automatically returns the latter and the arm or portion 36 to their initial positions after the lateral force upon the stock stop is removed so that the stop is again in proper location for cooperation with bar stock fed through the spindles. However, should the lateral displacement of the stop be sufficient to cause the projections 44 to completely leave the recesses 43, the planar surfaces 46 on the projections simply ride upon the cooperating planar face of the bracket 33 and the stop may be again returned to its initial position by applying an oppositely directed force to the portion of arm 36. This does not require the use of any special tool nor stoppage of the machine and, when the projections 44 again enter the recesses 43, the stop is accurately repositioned for alignment with the bar stock to be fed so that it is not necessary to spend time in resetting the stop. Furthermore, the construction is such that no part of the stop mechanism can fall into the path of the cutoff slide 26 as is the case when breakage occurs.

The force required to effect lateral or rotative displacement of the arm or portion 36 of the stop can be predetermined by selection of the strength of the spring 40 and/or by adjusting the position of the nut 41 upon the shaft or member 37. This nut is preferably of the locking type so that it will retain its adjusted position. In the form shown, this locking action is effected by slotting a portion of the nut, as indicated at 47, and providing a set screw 48 to effect slight displacement of the portions of the nut on either side of the slot 47 thereby causing the thread of the nut to grip the adjacent threaded portion 42 of the shaft 37.

It will be understood that the invention is susceptible of various modifications and adaptations within the scope of the appended claims and is not to be considered as limited to the exact details of construction here shown and described.

Having thus described the invention, I claim:

1. In a machine tool having an indexible carrier supporting a plurality of hollow spindles through which stock is axially fed, a stock stop including a portion extending transversely relative to the axes of said spindles, a member pivotally supporting said stock stop for rocking movement to and from a position in the path of stock fed through one of said spindles in an indexed position of the carrier, cooperating axially engageable interfitting surfaces on said member and stock stop normally preventing relative rotation therebetween, and spring means exerting an axially directed force to maintain said interfitting surfaces engaged, the said surfaces having cooperating portions such that rotative force applied to said stock stop rocks the latter through yielding of said spring means thereby preventing damage to the machine tool resulting from lateral engagement of objects with said stop.

2. The combination as defined in claim 1 wherein the said cooperating portions of the said interfitting surfaces are inclined at angles such that the said spring means restores said stop to its normal position after rotative displacements thereof less than those resulting in complete disengagement of said surfaces.

3. In a machine tool having an indexible carrier supporting a plurality of hollow spindles through which stock is axially fed, a stock stop including a portion extending transversely relative to the axes of said spindles, a member pivotally supporting said stock stop for arcuate movement to and from a position in the path of stock fed through one of said spindles in an indexed position of the carrier, an axially extending projection and cooperating recess upon said member and stop interengaged for preventing relative rotation between said member and stop, and spring means exerting an axially directed force upon said member and stop to maintain said projection and recess engaged, the said projection and recess having cooperating side portions such that rotative force applied to said stock stop rocks the latter through yielding of said spring means thereby preventing damage to the machine tool resulting from lateral engagement of objects with said stop.

4. In a machine tool having an indexible carrier supporting a plurality of hollow spindles through which stock is axially fed, a stock stop including a portion extending transversely relative to the axes of said spindles, means pivotally supporting said stock stop for rocking movement to and from a position in the path of stock fed through one of said spindles at an indexed position of the carrier, the said means including a member nonrotatively connected to said stock stop and a member to which said stock stop is pivoted, cooperating axially engageable interfitting surfaces on said members normally preventing relative rotation therebetween, and spring means exerting an axially directed force upon the said members to maintain the interfitting surfaces engaged, the said surfaces having cooperating inclined portions such that rotative force applied to said stock stop rocks the latter through yielding of said spring means thereby preventing damage to the machine tool resulting from lateral engagement of objects with said stop.

5. In a machine tool having an indexible carrier supporting a plurality of hollow spindles through which stock is axially fed, a stock stop including a portion extending transversely relative to the axes of said spindles, a member pivotally supporting said stock stop for rocking movement to and from a position in the path of stock fed through one of said spindles at an indexed position of the carrier, cooperating axially engageable interfitting surfaces on said member and stock stop normally preventing relative rotation therebetween, spring means exerting an axially directed force to maintain said interfitting surfaces engaged, the said surfaces each having an inclined side with the said sides in engagement so that rotative force applied to said stock stop rocks the latter through yielding of said spring means thereby preventing damage to the machine tool by lateral engagement with said stop of stock or objects thereon, and means connected to said member for moving the latter and said stock stop as a unit, whereby the stock stop may be removed from the path of stock fed through said spindles without displacement of said interfitting surfaces.

6. The combination as defined in claim 5 wherein the last-mentioned means comprises a pivotal support for said member and an operating arm connected to said member and extending transversely therefrom.

7. In a machine tool having an indexible carrier supporting a plurality of hollow spindles through which stock is axially fed, a stock stop comprising an arm provided adjacent one end with an abutment for stock fed through a spindle at an indexed position of the carrier, a member having an elongated bore extending parallel with said spindles, a shaft rockably supported in said bore and extending beyond the ends thereof, means connecting said shaft to the other end of said arm in a manner such that the arm extends transversely of the axes of said spindles, a member non-rotatably connected to said shaft adjacent the other end of the latter, cooperating axially engageable interfitting surfaces on the last-mentioned member and the adjacent portion of the first-mentioned member normally preventing relative rotation therebetween, and spring means exerting an axially directed force upon the said members to maintain the interfitted surfaces engaged, the said surfaces each having an inclined side portion with the said inclined portions in engagement so that rotative force applied to said arm rocks the latter thereby preventing damage to the machine tool by lateral engagement of objects with said arm.

8. In a machine tool having an indexible carrier supporting a plurality of hollow spindles through which stock is axially fed, a stock stop comprising an arm provided adjacent one end with an abutment for stock fed through a spindle at an indexed position of the carrier, a member having an elongated bore extending parallel with said spindles, a shaft rockably mounted on said bore and extending beyond the ends thereof, means connecting said shaft to the other end of said arm in a manner such that the arm extends transversely of the axes of said spindles, a member axially slidable upon and non-rotatably connected to said shaft adjacent the other end of the latter, cooperating axially engageable interfitting surfaces on the last-mentioned member and the adjacent portion of the first-mentioned member normally preventing relative rotation therebetween, and compression spring means exerting an axially directed force upon the said members to maintain the interfitting surfaces engaged, the said surfaces having inclined side portions such that rotative force applied to said arm rocks the latter and said shaft through yielding of said spring means thereby preventing damage to the machine tool by lateral engagement of objects with said arm.

9. In a machine tool having an indexible carrier supporting a plurality of hollow spindles through which stock is axially fed, a stock stop rockable into and out of the path of stock fed through the spindles at an indexed position of the carrier including a bracket member having a bore therethrough, means pivotally supporting said bracket member for rocking movement with the axis of said bore maintained parallel with the axes of said spindles, a shaft rockably supported in said bore and extending beyond the ends thereof, a member slidably and non-rotatably connected to said shaft adjacent one end of the latter, axially engageable cooperating interfitting surfaces on the member connected to the shaft and the adjacent portion of the first-mentioned member normally preventing relative rotation therebetween, an arm connected to said shaft adjacent the other end thereof with said arm extending transversely relative to the axes of said spindles and adapted to be selectively rocked into and out of the path of stock fed through said spindles by rocking of said bracket member, the said surfaces having axially inclined portions such that rotative force applied to said arm causes the last-mentioned member to be rotatively and axially displaced relative to said bracket member, and spring means exerting an axially directed force upon said members to maintain the interfitting surfaces engaged.

10. In a machine tool having an indexible carrier supporting a plurality of hollow spindles through which stock is axially fed, a stock stop rockable into and out of the path of stock fed through the spindles at an indexed position of the carrier including a bracket member having a bore therethrough, means pivotally supporting said bracket member for rocking movement with the axis of said bore maintained parallel with the axes of said spindles, a shaft rockably supported in said bore and extending beyond the ends thereof, a member slidably connected to said shaft adjacent one end of the latter, an axially directed projection with an inclined side surface on one of said members engageable in a complementarily-shaped recess in the other of said members thereby normally preventing relative rotation therebetween, an arm connected to said shaft adjacent the other end thereof with the said arm extending transversely relative to the axes of said spindles and adapted to be selectively rocked into and out of the path of stock fed through said spindles by rocking of said bracket member, the angle of said inclined side surface being such that rotative force applied to said arm causes the last-mentioned member to be rotatively and axially displaced relative to said bracket member, and spring means exerting an axially directed force upon said member to maintain the said projection in engagement in said recess.

11. In a machine tool having an indexible carrier supporting a plurality of hollow spindles through which stock is axially fed, a stock stop rockable into and out of the path of stock fed through the spindles at an indexed position of the carrier including a bracket member having a bore therethrough, means pivotally supporting said bracket member for rocking movement with the axis of said bore maintained parallel with the axes of said spindles, a shaft rockably supported in said bore and extending beyond the ends thereof, a member slidably and non-rotatably connected to said shaft adjacent one end of the latter, an axially directed projection with inclined side surfaces on one of said members engageable in a complementarily-shaped recess in the other of said members thereby normally preventing relative rotation therebetween, an arm connected to said shaft adjacent the other end thereof with the said arm extending transversely relative to the axes of said spindles and adapted to be selectively rocked into and out of the path of the stock fed through said spindles by rocking of said bracket member, the said inclined side surfaces being such that rotative force applied to said arm causes the last-mentioned member to be rotatively and axially displaced relative to said bracket member, a compressive spring surrounding said shaft with one end thereof engaging said slidable member on the outer end of the latter, and an abutment for the other end of said spring adjustably connected to said shaft.

12. The combination as defined in claim 11 wherein the angles of the inclined sides of said projection and recesses are such that the said spring restores said arm to its normal position after rotative displacements thereof less than those resulting in complete disengagement of said surfaces.

References Cited in the file of this patent

UNITED STATES PATENTS

| Number | Name | Date |
|---|---|---|
| 2,118,014 | Montgomery et al. | May 17, 1938 |
| 2,192,198 | Montgomery et al. | Mar. 5, 1940 |
| 2,605,539 | Cuttat | Aug. 5, 1952 |
| 2,617,175 | Drissner | Nov. 11, 1952 |